Patented Dec. 10, 1929

1,738,864

UNITED STATES PATENT OFFICE

ERNEST M. BROGDEN, OF WINTER HAVEN, FLORIDA, ASSIGNOR TO BROGDEX COMPANY, OF WINTER HAVEN, FLORIDA, A CORPORATION OF FLORIDA

ART OF PROTECTIVELY TREATING FRUIT AND THE LIKE

No Drawing. Application filed February 15, 1922. Serial No. 536,816.

This invention relates to art of protectively treating fruit and the like; and it relates more particularly to compositions useful especially in coating certain fresh fruits and vegetables for the purpose of maintaining the flavor, freshness and soundness thereof unimpaired for relatively long periods of time and otherwise advantageously affecting them. The invention also includes methods of treating fruit and the like with said compositions.

It is well known that citrus fruits, especially when prepared and packed for market according to methods commonly in vogue until recently, must be gotten to the ultimate consumer in a very short time, say about fifteen days on the average, in order to be salable; and that even under the most favorable circumstances such fruit undergoes marked shrinkage, loss of freshness, flavor and firmness, and is subject to excessive deterioration through mold, rot, and the like.

In an earlier application I have described and claimed methods of treating fresh fruit, especially citrus fruit, such as oranges, grapefruit, lemons and the like, by applying to the same a protective and preservative composition consisting generally of a waxy material, such as paraffin wax, associated with a volatile solvent or liquid vehicle such as gasoline, benzine, or the like, such composition being thoroughly rubbed upon and distributed over the surface or rind of the fruit in such a way as to form a very thin coating which, upon evaporation of the volatile solvent, provides the fruit with a protective film-like covering that is substantially impervious to moisture, checks evaporation of the fruit juices and thus prevents shrinkage and loss of flavor, forms an effective barrier to infection of the fruit by mold and rot organisms, and otherwise effectively preserves the fruit in its original fresh and sound condition.

The present invention relates to subject matter generally similar to that just referred to, but involves the use of certain coating and preserving compositions which offer further advantages under some conditions and in certain particulars to be described in detail hereinafter.

I have found that the employment of a very finely divided solid material in the aforesaid type of preservative coating composition for fruit, and particularly of a material such as starch that is colloidal in character or capable of existing in colloidal condition, offers certain very marked advantages both as regards the preservative function of the composition and also as regards the polish or finish that can be imparted to the fruit during or subsequent to the coating procedure proper. I have also found that certain novel procedures can be employed in this connection that offer decided practical advantages.

Without intending to limit the scope of the invention to specific details of composition or procedure, certain concrete examples will be described hereinafter specifically for the purpose of affording a clear understanding of the underlying principles involved and in order that those skilled in the art may practice the invention in the best manner now known to me. In giving these specific examples, reference will be made more particularly to the treatment of fresh fruit, especially citrus fruits; but it is to be understood that the invention is not restricted to such details and is applicable not only to citrus fruits but also to other globular fruits such as apples, peaches, cantaloupes, etc., and even also to certain vegetables that are susceptible of such treatment, such as cucumbers and tomatoes, for example. All such edible articles are intended herein to be included in the expression "fruit and the like".

In general it is desirable that the protective coating composition employed in practicing the invention be in a semi-fluid or semi-solid condition, that is, in such condition that it has a magma-like or creamy consistency, and that it has good spreading properties so that it can be worked thoroughly over the surface of the fruit in such manner as to leave the desired thin film coating thereon. To this end, in the preferred embodiments of the invention hereinafter described dry powdered starch or other suitable finely divided solid material is employed in relatively large proportions in the composition, and in general a larger volume of the starch or the like than of the volatile liquid vehicle should be employed. It is also usually desirable to incorporate in the composition something in the nature of a binder or mildly adhesive material in order to insure satisfactory adhesion of the starch particles to each other and to the surface of the fruit and to properly fill the pores of the fruit rind or skin. Such binder or adhesive material is therefore incorporated in the composition in the best form thereof now known to me; and in some cases I may employ more than one such binder or adhesive. In general, the quantity of such binder or adhesive should be relatively small as compared to the quantity of starch used, and it is also considerably less as a rule than the quantity of the volatile solvent or liquid vehicle employed. For best results the composition should be free or substantially free of water.

One typical mixture that provides a protective coating composition of the desired character in accordance with the invention may be obtained by intimately commixing one volume of gasoline with one-fourth volume of paraffin wax, and then thoroughly incorporating about two volumes of powdered starch, which latter may, for example, be ordinary commercial cooking starch. In this instance the paraffin functions as the binder for the starch, and it also performs the function of increasing the waterproofing and sealing effect desired. In preparing this mixture, the best procedure is to melt the paraffin wax (whose melting point may for example be about 122° F.) and heat it to about 140° F., and then pour in the gasoline gradually while stirring. Before adding the gasoline, it is desirable to heat it to about 100° F. or thereabout in order to avoid chilling the molten paraffin. Another procedure is to heat the gasoline to near its boiling point and to pour the molten paraffin into the heated gasoline, stirring meanwhile; or the molten paraffin and warm or hot gasoline may be run into a mixing container simultaneously, while stirring. The starch may now be added immediately or later as desired, and after being added it should be thoroughly stirred into the gasoline-wax mixture, forming a smooth creamy semi-fluid mixture of excellent spreading properties if the procedure has been properly carried out as described. It is important to avoid adding too much starch, however, as any substantial excess is apt to destroy the creamy consistency sought, and to give a mixture that tends to become solid and crumbly.

The gasoline mentioned in the foregoing example and in others to be given hereinafter may be any good commercial gasoline. It is to be noted also that gasoline is only one of various non-aqueous solvents that are suitable for the purposes in view. For example, such solvents as benzine, benzol, and the like, can be used with success; and I have found that an especially desirable solvent to use in practicing the invention is a so-called paint solvent put out by the Standard Oil Company and obtainable in certain parts of the country, particularly in California, under the trade name of Oronite. I have also employed this solvent with success in treating fruit with a preservative mixture consisting only of said solvent and paraffin wax in the proportion, for example, of two parts by volume of Oronite to one part by volume of paraffin wax. Such mixture, when prepared in any of the ways above mentioned for mixing paraffin and a volatile solvent, gives a mixture of pasty or creamy consistency at around 60° F.; and at temperatures around 80° to 90° F., a mixture of equal volumes of Oronite and paraffin wax gives a mixture of similar consistency.

Another mixture that gives good results can be prepared by using one volume of gasoline, one-fourth volume of paraffin oil, and two and one-fourth volumes of powdered starch. In this instance the paraffin oil provides the desirable binding or adhesive characteristics. It should be understood that the paraffin oil here referred to is in the nature of a light lubricating oil remaining after removal of paraffin wax from the fraction that is obtained after distilling off the burning oils in ordinary oil distillation methods. The paraffin oil here in question is obtainable commercially under that name at the present time. Some other oil, relatively heavy as compared to the gasoline or other light solvent forming the principal liquid vehicle in the composition, may of course be employed instead of paraffin oil; but the latter has been found in practice to give good results.

A mixture that has been found especially effective may be prepared by intimately commixing one volume of gasoline, one-fourth volume of paraffin oil, one-fourth volume of paraffin wax, and two volumes of powdered starch. In this case both the paraffin oil and paraffin wax exercise a desirable binding action on the starch, and in addition are effective in rendering the final film coating on the fruit waterproof and impenetrable by undesirable organisms.

In all of the foregoing specific examples, it is permissible to include also a harmless coloring agent or dye to mask the whiteness of the starch constituent and thus to render the presence of the coating on the fruit unnoticeable to the unpracticed eye. As an example of such a harmless coloring agent, useful where fruits such as oranges or grapefruit are to be treated, may be mentioned the vegetable dye known as annatto (arnotto), which is often used, as is well known, to color butter for instance. Where paraffin oil is included in the composition, there is less necessity for adding a coloring agent, although it may be used in that case also if deemed desirable.

In treating fruit with any of the mixtures above described, a small quantity of the composition may be applied in any convenient manner to each fruit and then thoroughly rubbed all over the surface to distribute the composition in a thin uniform layer which, after evaporation of the volatile solvent, leaves a firmly adherent film coating of the desired protective and preservative character. Thorough rubbing or buffing of the coated fruit by means of polisher apparatus, such as the well known Stebler-Parker polisher, for example, also imparts an excellent polish to the fruit, the presence of the starch being especially effective in producing this result which, as is well known, is a highly important factor in the trade. The starch also appears to favor rapid evaporation of the volatile solvent from the composition after it is applied to the fruit, and this also is an important practical advantage. It also tends to keep the coating and polishing brushes of the machines employed in the coating process from becoming excessively gummed, this tendency to gum being most pronounced where a waxy material such as paraffin is a constituent of the mixture applied. In coating the fruit with the preservative composition, care should be taken not to thickly coat the stem end, since a too complete sealing of the stem end often results in the fruit soon spoiling. This trouble can be avoided by the use of brush rolls which rub the fruit thoroughly and ensure that only a thin film of the coating material remains thereon, especially on the stem end.

The operations of rubbing the pasty or creamy coating composition on the fruit and of giving the fruit the final polishing by rubbing or buffing may take place practically simultaneously if desired; but I have found that a better result can be obtained in most cases if all or the greater part of the volatile solvent be evaporated from the fruit before the final polishing or buffing takes place. This can readily be effected by passing the fruit through a suitable drier or evaporator device after the pasty composition has been applied and thoroughly distributed over the fruit and before the fruit goes to the final polisher or buffing apparatus.

While it is ordinarily most desirable, as above pointed out, to include a binder of some kind in the composition, I have found that for certain purposes a coating and preservative mixture of a non-aqueous liquid and powdered starch, without such binder, can be very usefully employed in certain embodiments of the invention. For example, such mixture may be used to advantage in a procedure wherein the fruit has received at an earlier stage of the treatment a waxy coating but where it is desired to obtain a higher polish. For example, a composition resulting from intimately commixing one volume of gasoline or other volatile solvent with two and one-fourth volumes of starch, which is of a desirable pasty or creamy consistency when properly prepared, can be applied to fruit that has already received a waxy coating, obtained for example by thoroughly rubbing a mixture of paraffin and gasoline over the fruit; and when fruit that has received this double or two-step treatment is subjected to the polishing and buffing action of the polisher rolls, it acquires an exceptionally good polish. Furthermore, this final buffing or polishing treatment has the further useful effect of removing from the previously coated fruit any excess of waxy coating that it may have received, and also of smoothing out any inequalities and rendering the previously applied coating more uniform in thickness over the entire surface of the fruit, this action being due in part of course to the softening and solvent action of the gasoline in the gasoline-starch mixture upon the previously applied waxy coating. I believe it to be broadly new to apply a waxy or other protective coating to fruit and the like and then to apply a polishing agent and rub to produce a polish. The described mixture consisting only of gasoline and starch should most desirably be colored with a harmless vegetable dye that matches the color of the fruit being treated, as before explained in connection with the mixtures previously described. It is to be understood, however, that the use of this gasoline-starch mixture is not intended to be restricted to a secondary or final treatment of fruit which has previously been provided with a protective coating.

Fruit or vegetables treated in accordance with the invention retain for long periods their original freshness and flavor, remain firm and plump, do not rot unless already infected prior to coating, and are characterized by fine appearance.

What I claim is:

1. A composition for treating fruit and the like comprising starchy material in intimate commixture with an oily vehicle, the aforesaid ingredients constituting the bulk of said composition.

2. A composition for treating fruit and the like comprising starchy material in intimate commixture with an oily vehicle of which at least the greater portion is substantially more volatile than kerosene, said mixture being of a consistency thicker than water and possessing good spreading properties, the aforesaid ingredients constituting the bulk of said composition.

3. A composition for treating fruit and the like comprising, in intimate commixture, a solid filler in a state of extremely fine subdivision and a fluid vehicle comprising a hydrocarbon oil, said commixture having a consistency thicker than water and possessing good spreading properties, the aforesaid ingredients constituting the bulk of said composition.

4. A composition for treating fruit and the like comprising, in intimate commixture, finely powdered starch, a binder, and a substantially non-aqueous liquid of which at least the greater portion is of higher volatility than kerosene, the aforesaid ingredients constituting the bulk of said composition.

5. A composition for treating fruit and the like comprising in intimate commixture finely powdered starch, a waxy material, and a hydrocarbon liquid, the aforesaid ingredients constituting the bulk of said composition.

6. A composition for treating fruit and the like comprising in intimate commixture, finely powdered starch, and a substantially non-aqueous liquid of which a minor portion is less volatile than kerosene and the greater portion is substantially more volatile than kerosene, the aforesaid ingredients constituting the bulk of said composition.

7. A composition for treating fruit and the like comprising in intimate commixture finely powdered starch, a waxy material, a hydrocarbon liquid more volatile than kerosene, and a minor proportion of a heavier oil.

8. A composition for treating fruit and the like comprising, in intimate commixture, starch and a highly volatile hydrocarbon liquid, the aforesaid ingredients constituting the bulk of said composition.

9. A composition for treating fruit and the like comprising, in intimate commixture, starch and a highly volatile hydrocarbon liquid, a larger quantity of starch than of said liquid, by volume, being employed in preparing the commixture.

10. A composition for treating fruit and the like resulting from intimate commixture of a relatively volatile hydrocarbon liquid with substantially more than its volume of finely powdered starch.

11. A composition for treating fruit and the like resulting from intimate commixture of a relatively volatile hydrocarbon liquid with at least about double its volume of finely powdered starch.

12. A composition for treating fruit and the like resulting from intimate commixture of a relatively volatile hydrocarbon liquid with substantially more than its volume of finely powdered starch, and substantially less than its volume of paraffin wax.

13. A composition for treating fruit and the like resulting from intimate commixture of a relatively volatile hydrocarbon liquid with substantially more than its volume of finely powdered starch, substantially less than its volume of paraffin wax, and substantially less than its volume of a relatively heavy oil.

14. A composition for treating fruit and the like resulting from intimate commixture of a relatively volatile hydrocarbon liquid with substantially more than its volume of finely powdered starch and substantially less than its volume of a relatively heavy oil.

15. A composition for treating fruit and the like resulting from intimate commixture of one volume of a relatively volatile hydrocarbon liquid, approximately two volumes of powdered starch, and approximately one-fourth volume of paraffin wax.

16. A composition for treating fruit and the like resulting from intimate commixture of one volume of a relatively volatile hydrocarbon liquid, approximately two volumes of powdered starch, approximately one-fourth volume of paraffin oil, and approximately one fourth volume of paraffin wax.

In testimony whereof I hereunto affix my signature.

ERNEST M. BROGDEN.